United States Patent
Perinchery et al.

(10) Patent No.: US 10,070,191 B2
(45) Date of Patent: Sep. 4, 2018

(54) SYSTEMS AND METHODS FOR DISPLAYING VIDEO CONTENT RELEVANT TO APPLICATION CONTENT

(71) Applicant: SLING MEDIA PVT LTD, Bangalore (IN)

(72) Inventors: Melvin P. Perinchery, Bangalore (IN); Venkatesan Thiyagarajan, Tamil Nadu (IN); Jayakumar Ananthan, Bangalore (IN)

(73) Assignee: SLING MEDIA PVT LTD, Bengaluru ( * ) Notice: Subject to any disclaimer, the term of this patent is extended or adjusted under 35 U.S.C. 154(b) by 0 days.

(21) Appl. No.: 14/724,482

(22) Filed: May 28, 2015

(65) Prior Publication Data
US 2016/0191979 A1 Jun. 30, 2016

Related U.S. Application Data

(60) Provisional application No. 62/098,687, filed on Dec. 31, 2014.

(51) Int. Cl.
| | |
|---|---|
| *G06F 3/00* | (2006.01) |
| *G06F 13/00* | (2006.01) |
| *H04N 5/445* | (2011.01) |
| *H04N 21/4782* | (2011.01) |
| *H04N 21/431* | (2011.01) |
| *H04N 21/442* | (2011.01) |
| *H04N 21/466* | (2011.01) |
| *H04N 21/4722* | (2011.01) |

(52) U.S. Cl.
CPC ..... *H04N 21/4782* (2013.01); *H04N 21/4316* (2013.01); *H04N 21/44222* (2013.01); *H04N 21/4668* (2013.01); *H04N 21/4722* (2013.01)

(58) Field of Classification Search
CPC .. H04N 21/47; H04N 21/472; H04N 21/4722; H04N 21/4725; H04N 21/4782; H04N 21/4828
USPC ............................ 725/37, 39, 40, 43, 51, 61
See application file for complete search history.

(56) References Cited

U.S. PATENT DOCUMENTS

| | | | | |
|---|---|---|---|---|
| 2004/0034866 | A1* | 2/2004 | Yuen ................... | G11B 23/042 725/40 |
| 2010/0082785 | A1* | 4/2010 | Fein ...................... | H04W 4/02 709/222 |
| 2010/0333133 | A1* | 12/2010 | Krakirian ........... | H04N 7/17318 725/32 |
| 2012/0174039 | A1* | 7/2012 | Rhoads .............. | H04N 21/4312 715/854 |
| 2014/0282730 | A1* | 9/2014 | Hieb ................... | H04N 21/482 725/41 |
| 2015/0046780 | A1* | 2/2015 | Ismalon ............. | G06F 17/3089 715/203 |
| 2015/0067733 | A1* | 3/2015 | Weber ................. | H04H 20/38 725/40 |

(Continued)

*Primary Examiner* — Kyu Chae
(74) *Attorney, Agent, or Firm* — Lorenz & Kopf LLP

(57) ABSTRACT

Methods, systems and devices for viewing video content are provided. Video content is displayed in a video region of a display, while application content is displayed in an application region of the display. Based on the application content, candidate video content relevant to the application content is determined and, in response to user input, selected video content is displayed in the video region of the display.

6 Claims, 6 Drawing Sheets

(56) References Cited

U.S. PATENT DOCUMENTS

2015/0356101 A1* 12/2015 Cohen ................ G06F 17/3089
                                                            707/722
2016/0006679 A1*  1/2016 Williams ............... H04L 51/10
                                                            455/466

* cited by examiner

SYSTEMS AND METHODS FOR DISPLAYING VIDEO CONTENT RELEVANT TO APPLICATION CONTENT

CROSS-REFERENCE TO RELATED APPLICATIONS

This application claims priority to U.S. Provisional Patent Application No. 62/098,687, filed Dec. 31, 2014, the contents of which are hereby incorporated by reference.

TECHNICAL FIELD

The present disclosure generally relates to the viewing of media content. More particularly, the following discussion relates to systems, methods, and devices for viewing video content relating to application content.

BACKGROUND

Recent years have seen a dramatic increase in the number and type of media content sources that a user typically has access to, including, for example, streaming services, IP video-on-demand, network television programming, media content stored on digital video recorders, and a wide range of other sources. At the same time, the ubiquity of tablet computers, smartphones, and other computing devices has provided increased options for viewing such content.

While it is increasingly popular to view movies, television programs, and the like while simultaneously employing a web browser or other such application to read news items, perform web searches, and the like, the video content and application content are generally not related to each other, and are typically not presented in a way that enhances the user's viewing experience.

Accordingly, there is a need for improved systems, devices, and techniques for viewing video content. These and other desirable features and characteristics will become apparent from the subsequent detailed description and the claims, taken in conjunction with the accompanying drawings and this background section.

BRIEF SUMMARY

Several examples of systems, devices, methods, and user interfaces are described for viewing media content. A method in accordance with one embodiment includes displaying video content in a video region of a display; displaying application content in an application region of the display; determining, based on the application content, candidate video content relevant to the application content; determining, in response to user input, selected video content; and displaying the selected video content in the video region of the display.

A video content display system in accordance with one embodiment includes a computing device configured to display video content in a video region of a display and display application content in an application region of the display. The system further includes a media device communicatively coupled to the computing device over a network, the media device including a discovery engine configured to determine, based on the application content, candidate video content relevant to the application content and determine, in response to user input, selected video content. The computing device is configured to display the selected video content in the video region of the display.

A media device in accordance with one embodiment includes a processor and a memory configured to store computer-readable software instructions. The software instructions, when executed by the processor, cause the processor to: produce a first user interface; receive a request, via the first user interface, to compile a requested plurality of episodes of a selected media content; determine the availability of the requested plurality of episodes from a plurality of media content sources; compile the requested plurality of episodes; and present a second user interface including a series-order arrangement of the requested plurality of episodes.

Alternate embodiments, aspects and other features are described in more detail herein.

BRIEF DESCRIPTION OF THE DRAWING FIGURES

Exemplary embodiments will hereinafter be described in conjunction with the following drawing figures, wherein like numerals denote like elements.

DETAILED DESCRIPTION

Systems and methods are provided for viewing video content (e.g., movies, short videos, and the like) relevant to application content (e.g., the contents of a web browser window being viewed alongside the video content). Briefly, video content is displayed in a video region of a display, while application content is displayed in an application region of the display. Based on the application content, candidate video content relevant to the application content is determined (e.g., via the parsing of text for keywords) and, in response to user input, the selected video content is displayed in the video region of the display. In that regard, the following detailed description of the invention is merely exemplary in nature and is not intended to limit the invention or the application and uses of the invention. Furthermore, there is no intention to be bound by any theory presented in the preceding background or the following detailed description.

Figure 1:
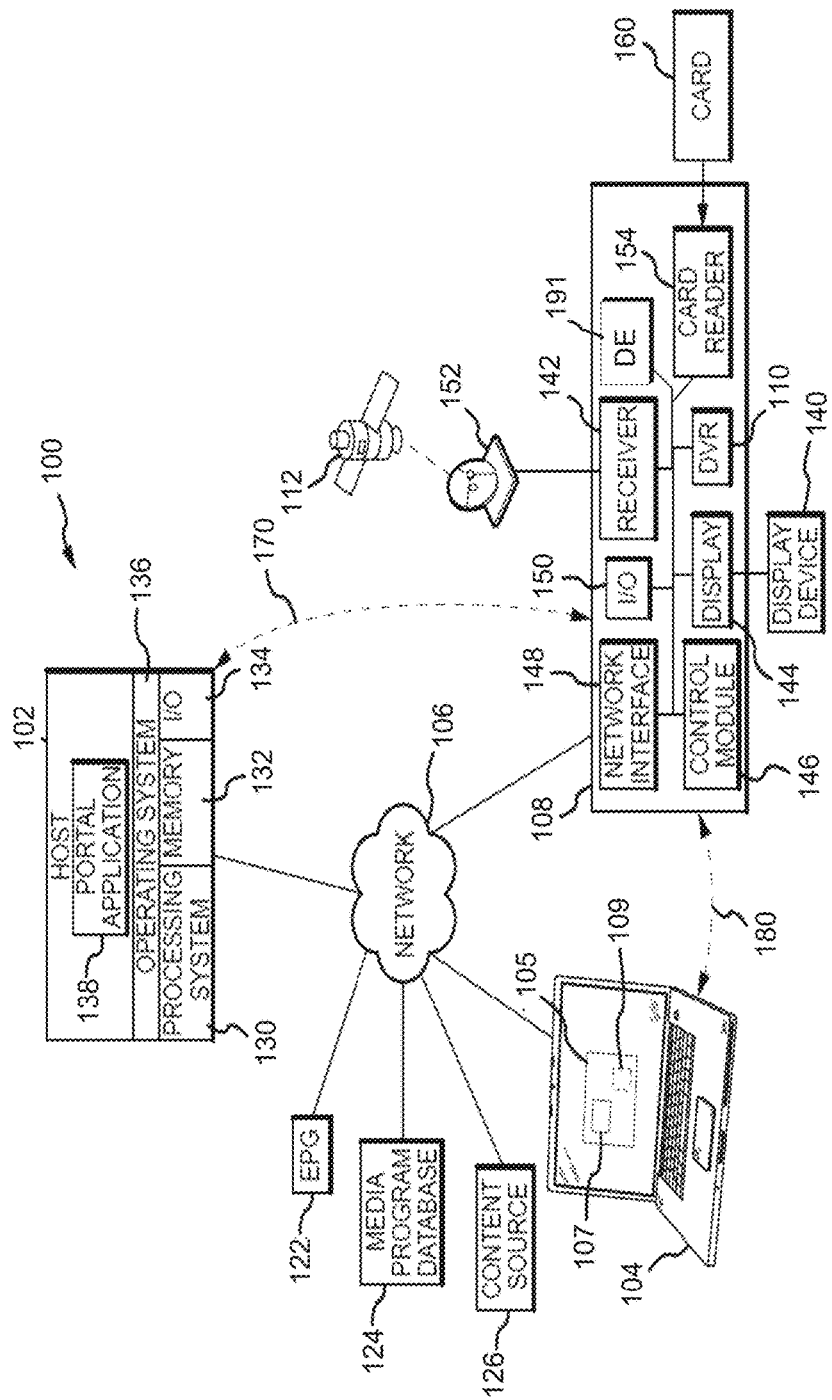
FIG. 1 is a block diagram illustrating a place-shifting system in which the present embodiments may be implemented.

The systems and methods described herein may be implemented in the context of a wide variety of entertainment devices and systems. FIG. 1 depicts just one, non-limiting, example: a system 100 for placeshifting or otherwise transferring data or content, such as a media program (or media content), from a source electronic device 108 to a destination electronic device 104 over a network 106 for presentation to a user (or viewer) on the destination electronic device 104.

For purposes of explanation, but without limitation, the source device 108 may be alternatively referred to herein as a media device or a placeshifting device, and the destination electronic device 104 may be alternatively referred to herein as a playback device or a client device (or client). The placeshifting system 100 also includes a host server 102 (or host) that communicates or otherwise interacts with the devices 104, 108 over the network 106 to facilitate establishment of a peer-to-peer connection 180 over the network 106, which may be utilized for a placeshifting session.

In one embodiment, as described in further detail below, source device 108 includes a discovery engine 191 including any suitable combination of hardware and/or software configured to locate video content within one or more content sources (e.g., content source 126) relevant to application content (e.g., web browser content) being viewed by a user.

It should be understood that FIG. 1 is a simplified representation of the placeshifting system 100 for purposes of explanation is not intended to limit the subject matter described herein in any way.

In practice, the client device 104 may be any device, component, module, hardware and/or the like that is capable of communicating with the server 102 over network 106. For example, depending on the embodiment, client device 104 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 106 and presenting audio and/or visual content. In this regard, the client device 104 includes a display device, such as a monitor, screen, or another conventional electronic display, capable of graphically presenting visual content, data and/or information that is generated or otherwise provided by an application 105, 107 executing on the client 104. The client device 104 may further include a user input device, such as a keyboard, a mouse, a touchscreen, or the like, capable of receiving input data and/or other information from the user of the client device 104. The client device 104 also includes a processing system and a data storage element (or memory) that is coupled to or otherwise accessed by the processing system and stores programming instructions that, when read and executed, cause the processing system of the client device 104 to generate one or more applications 105, 107, 109 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 104 may reside at a geographic location that is remote or otherwise physically distinct from the geographic location of the media device 108. In this regard, the media device 108 may have an essentially fixed or permanent geographic location, whereas the geographic location of the client 104 may be transient or otherwise variable with respect to the location of the media device 108. For example, the media device 108 may be realized as a set-top box or a similar device that resides at a user's home for providing media content to the user's television or other home display device 140, while the client 104 is realized as a portable electronic device, such as a mobile phone or other mobile computing device, that moves about with the user.

In the embodiment shown in FIG. 1, client device 104 executes a conventional browser or other client application 105 that is compatible with standard Internet, world wide web (WWW), transmission control protocol, and/or Internet Protocol (TCP/IP), and/or other formats. Such browsers are typically capable of displaying active or other documents formatted in accordance with published protocols and/or computer languages (e.g., hypertext markup language (HTML), extensible markup language (XML), cascading style sheets (CSS), Javascript, and/or the like). Many browsers are also capable of executing "plugin" applications, applets or the like. Such plugins may be formatted in accordance with ActiveX, JAVA, Javascript and/or any number of other formats. A number of commonly used web browsers are available for a number of different computing platforms, and the subject matter described herein is not limited to any particular browser application. In the illustrated embodiment, client 104 further includes a media player application 107. The media player 107 may be a standalone media player, or the media player 107 may be implemented as a plugin or other applet that runs within the client application 105 as desired. In some embodiments, media player 107 is initially obtained from a networked host, such as server 102. The media player 107 may be retrieved on an as-needed basis in some embodiments, or may be stored at client 104 for subsequent execution.

With continued reference to FIG. 1, in exemplary embodiments, media device 108 is any form of device, module, component, hardware and/or the like capable of receiving and processing media content from one or more content sources. For example, in some embodiments, media device 108 is a set-top box (STB) or similar system that is able to receive television programming and/or to record certain programs that can be viewed on a display device 140, such as a television, monitor, liquid crystal display (LCD), light emitting diode (LED) display, plasma display, or the like. Exemplary embodiments of media device 108 will therefore include or otherwise be coupled to a receiver interface 142 for receiving satellite, cable and/or broadcast programming signals from broadcast sources 112, as well as a data storage medium 110 (e.g., a hard disk, flash memory, or another suitable non-volatile data storage element) to support a digital video recorder (DVR) feature and/or functionality, a display interface 144 for providing imagery to the display device 140, and a control module 146 that directs the operations of the media device 108 as appropriate. For convenience, but without limitation, the data storage medium 110 is alternatively referred to herein as a DVR. Media device 108 may also include one or more interfaces 148 to the network 106 and/or an input/output interface 150 to a remote control or other device for providing user inputs to the media device 108, as appropriate. For example, the network interface(s) 148 of the media device 108 may include an interface or port for a wired communications layer (e.g., an Ethernet port or adapter), an interface for a wireless communications layer (e.g., an IEEE 802.11-compatible transceiver), and/or the like.

The components in media device 108 may be provided within a common chassis or housing as depicted in FIG. 1, although equivalent embodiments may implement media device 108 with any number of inter-connected but discrete components or systems. For example, in some embodiments, the media device 108 may be realized as a combination of a STB and a placeshifting device, wherein some features of the media device 108 (e.g., the DVR 110, the receiver 142, the display interface 144, and/or I/Os 150) are implemented by the STB and other features of the media device 108 (e.g., the network interface 148) are implemented by the placeshifting device, wherein the placeshifting device works in conjunction with the STB to shift the viewing experience from a home television (e.g., display device 140) to a viewing display on the client device 104 that is accessed via the network 106. Examples of placeshifting devices that may be used in some embodiments of media device 108 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 108 may be a hybrid DVR and/or receiver, for example, that also provides transcoding and placeshifting features. It should be appreciated that FIG. 1 depicts merely one exemplary embodiment of a media device 108, and in practice, the media device 108 may be logically and physically implemented in any manner to suit the needs of a particular embodiment.

In the exemplary embodiment illustrated in FIG. 1, media device 108 is capable of receiving digital broadcast satellite (DBS) signals transmitted from a broadcast source 112, such as a satellite, using an antenna 152 that provides received signals to the receiver 142. Equivalent embodiments, however, could receive programming at receiver 142 from any sort of cable connection, broadcast source, removable media, network service, external device and/or the like. In some embodiments, the media device 108 may also include an access card interface or card reader 154 adapted to receive an access card 160 (or viewing card) configured to ensure that the viewer is authorized to view media content provided to the primary display device 140. In this regard, the access card 160 includes unique identification information associated with a particular subscriber to the broadcast content source 112 or otherwise includes subscription information that facilitates receiving and/or decoding media content provided by the broadcast content source 112.

The DVR 110 feature stores recorded programming (e.g., recorded broadcast programming received via receiver 142) on a hard disk drive, memory, a networked server, or other storage medium as appropriate in response to user/viewer programming instructions, wherein the recorded programming may be subsequently viewed via the media device 108, either on display device 140 or client device 104 via network 106. Content stored in DVR 110 may be any sort of file-based programming or other content that is accessible to media device 108. In various embodiments, in addition to storing broadcast programming, the DVR 110 may also store programming received from other sources not illustrated in FIG. 1, such as, for example, programming downloaded from an on-demand programming source or an online programming source. Additionally, content in DVR 110 may be stored in any sort of compressed or uncompressed format, as desired, and may be encoded or transcoded as desired for effective receipt, storage, retrieval and playing.

The control module 146 is any sort of hardware, circuitry, processing logic and/or other components capable of directing the operations of media device 108. In various embodiments, control module 146 includes software or firmware logic and/or other programming instructions residing in memory and executing on any sort of processing system, such as any sort of processor, microprocessor, microcontroller, digital signal processor or the like. The instructions, when read and executed, cause the control module 146 to perform various tasks, functions, processes and/or operations and otherwise support the subject matter described herein. In various embodiments, the control module 146 is based upon a "system on a chip" (SoC) implementation that incorporates a hybrid microcontroller with memory, input/output and other features to perform the various signal processing and other actions of media device 108. Other embodiments may implement control module 146 and/or the other features of media device 108 with any number of discrete and/or integrated processing components (e.g., any sort of microprocessor or microcontroller), memories, input/output features and/or other features as desired. The control module 146 communicates with the network interface 148 to establish a peer-to-peer connection 180 to the client device 104 over the network 106 and support streaming of media programs (e.g., from the DVR 110 or the receiver 142) to the client device 104 over the network 106 via the peer-to-peer connection 180, as described in greater detail below.

In the embodiment of FIG. 1, the network 106 is any communications network (or a combination of communications networks) capable of transmitting data between devices within the system 100. In various embodiments, network 106 includes any number of public or private data connections, links or networks supporting any number of communications protocols. Network 106 may include the Internet, for example, or any other network. Such networks may be based upon TCP/IP or other conventional protocols, although other embodiments may use any type of alternate or successor protocols, as desired. In various embodiments, network 106 may also incorporate a wireless and/or wired telephone network, such as a cellular communications network for communicating with mobile phones, personal digital assistants, and/or the like. Various embodiments of network 106 may also incorporate any sort of wireless or wired local area networks (LANs), wide area networks (WAN), or the like.

In the illustrated embodiment of FIG. 1, the server 102 may be realized as one or more server computers or other device(s) coupled to the network 106 and capable of interacting with the devices 104, 108 to facilitate communications between the client device 104 and the media device 108 associated with the user or operator of the client 104. The server 102 may be implemented with a server computer system or data processing system that is based upon any processor, architecture and/or operating system, and will typically be implemented using a processing system 130, memory 132, and input/output features 134. Various embodiments may be implemented using dedicated or shared hardware servers; other implementations may make use of virtual server features as part of a "cloud computing" service, such as any of the cloud computing services provided by any number of providers.

While FIG. 1 illustrates a single server 102, many practical embodiments of the system 100 may provide a cluster or other collection of multiple host servers 102 to support any desired number of simultaneous communications with multiple clients 104 and/or multiple media devices 108. This cluster may also incorporate appropriate routing, load balancing, access and security mechanisms and or any number of other features. In various embodiments, each server 102 is an actual or virtual computer system executing an operating system 136 in conjunction with the processing system 130, memory 132 and/or I/O features 134 to provide a computing core that is capable of executing a portal application 138, as well as any number of daemons, processes, applications or other modules as desired. For example, a portal application 138 could execute as a daemon on the server 102, with connections to separate clients 104 being managed as separate processes or instances that communicate with portal application 138 using features provided by operating system 136. In one or more embodiments, the memory 132 stores programming instructions that, when read and executed, cause the processing system 130 to create, generate, or otherwise facilitate the portal application 138 and perform various tasks, functions, processes and/or operations described herein. In this regard, the memory 132 represents any non-transitory short or long term data storage element or other computer-readable media capable of storing programming instructions for execution by or on the processing system 130.

The user of the client 104 is able to connect to the portal application 138 supported by host 102 via the network 106, for example, by directing the client application 105 to a URL or other network address associated with host 102 and/or portal application 138. In exemplary embodiments, after the user is successfully authenticated by the portal application 138, the host 102 and/or portal application 138 establishes a connection 170 over the network 106 to the media device 108 that is associated with the user. Thereafter, the host 102 and/or the portal application 138 utilizes the connection 170 to obtain, from the media device 108 via the network 106, information about programming stored at the media device 108 and available for placeshifting to the client device 104, such as, for example, a listing of the media programs stored on DVR 110. It should be noted that although FIG. 1 depicts the network connection 170 as being between the host 102 and the media device 108, in practice, the placeshifting system 700 may include one or more intermediary components (e.g., one or more message servers) configured to establish, facilitate, or otherwise support the connection 170.

Server 102 is coupled to an electronic program guide 122, which may be realized as a server, a database, or another device operating on the network 106 that maintains information pertaining to current and/or future broadcasts (or airings) of media programs that are available to be received from broadcast source 112 (e.g., by the media device 108 via receiver 142 and/or antenna 152). The server 102 and/or the portal application 138 may obtain information pertaining to current and/or future broadcasts (or airings) of media programs from the electronic program guide 122 and generate or otherwise provide a program guide graphical user interface (GUI) display on the client device 104 (e.g., within client application 105) that indicates media programs that are or will be available for streaming from the media device 108. The user of the client device 104 may manipulate or otherwise utilize the graphical user interface (or the graphical user interface elements contained therein) to select or otherwise identify media programs for streaming to the client device 104 and/or recording to the DVR 110. The user may pause or otherwise stop presentation of the streamed media program and manipulate or otherwise operate the client application 105 to transmit or otherwise provide 412, via the network 106, a request for content to a third-party content source 126 (e.g., a third-party website). The third-party content source 126 responds to the request by transmitting or otherwise providing content to the client device 104 via the network 106.

In the illustrated embodiment of FIG. 1, the placeshifting system 100 also includes a media program database 124 that includes verified or validated metadata and/or other descriptive information for a vast array of media programs. For example, the media program database 124 may contain metadata and/or other descriptive information pertaining to substantially all of the media programs that may be available from one or more content sources within placeshifting system 100 (e.g., information pertaining to any media programs that have previously been aired by a broadcast source 112, along information pertaining to any movie that has been presented in theaters, made available on-demand, or released for individual use (e.g., on digital video disc (DVD) or the like)). In exemplary embodiments, for each media program having a record (or entry) in the media program database 124, the media program database 124 maintains a media data object that includes one or more fields of metadata associated with that media program along with one or more fields of program identifiers that may be used to identify that media program record. In this regard, the program guide 122 and the media program database 124 may utilize the same program identifiers to uniquely identify each media program.

Figure 2:
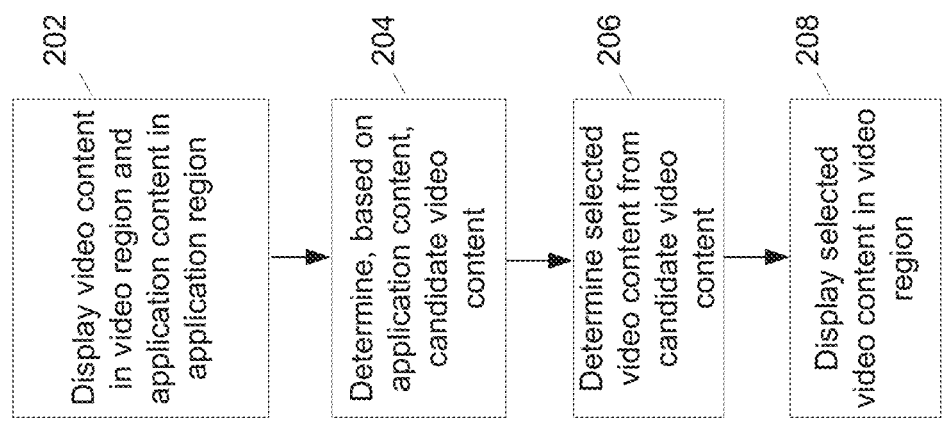
FIG. 2 is a flowchart depicting a method in accordance with one embodiment.
Figure 3:
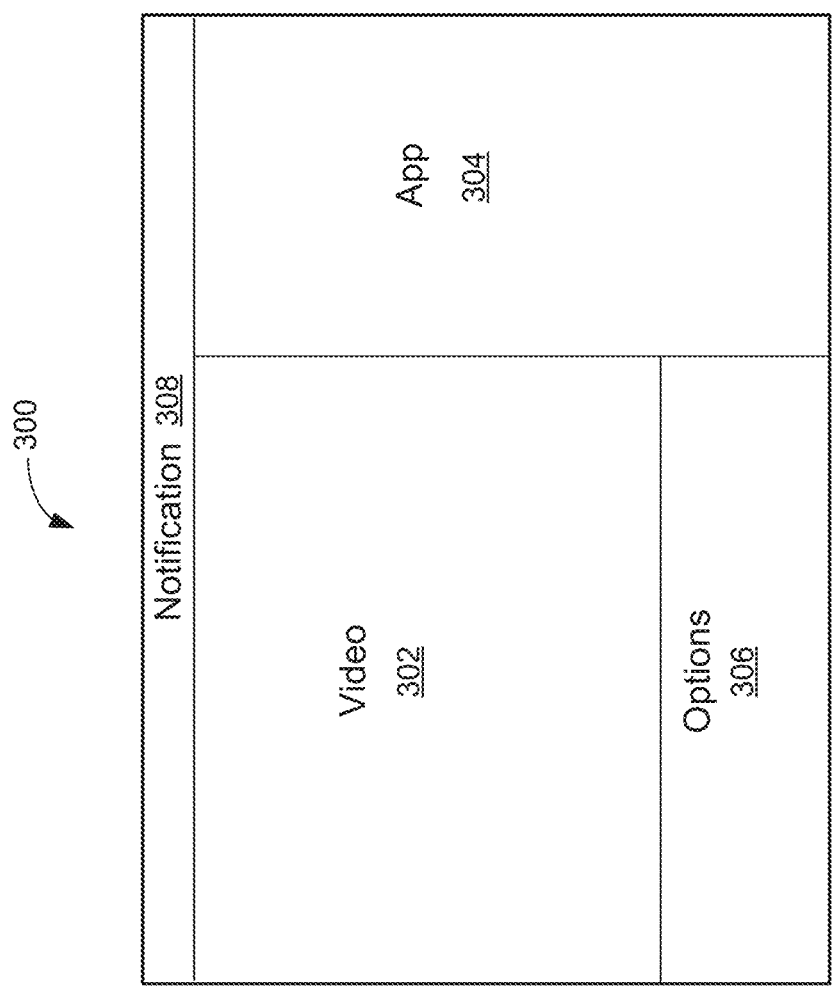
FIG. 3 depicts a display layout in accordance with one embodiment.

Having thus given an overview of an exemplary system in which the various embodiments described herein may be employed, an exemplary method will now be generally described in conjunction with FIGS. 1 and 2. Initially, at step 202, video content is displayed in a video region (e.g., a display associated with computing device 104 of FIG. 1) while application content is simultaneously displayed in an application region of the display. The application and video regions of the display may be configured in a variety of ways (e.g., side-by-side, top-to-bottom, etc.). More particularly, referring briefly to FIG. 3, an exemplary layout 300 includes a notification header region 308, a video region 302 near the left side of the display, an application region 304 to the right of video region 304, and an options region 306 adjacent the bottom portion of video region 302. Those skilled in the art will recognize that the particular geometry, size, and placement of regions 302, 304, 306, and 308 are not intended to be limiting. However, the layout 300 illustrated in FIG. 3 is desirable in that it allows video content to be viewed in a relatively large window 302 alongside a slightly narrower region 304 allowing application content (e.g., a news feed, search results, etc.) to be viewed on the right.

Referring again to FIG. 2, the method includes (at step 204) determining, based on application content, candidate video content. This step may be performed in a variety of ways and by one or more components illustrated in FIG. 1. For example, any text appearing within the application content displayed in application region 304 may be parsed for keywords (e.g., "homeland," "earthquakes," etc.), and those keywords may be used to query a database of available video content. Parsing of the text may be performed, in one embodiment, by computing device 104 (e.g., through a javascript application, browser plug-in, or the like). The set of keywords may then be transmitted to media device 108 over network 106 and further processed by discovery engine 191. In one embodiment, discovery engine 191 utilizes the set of keywords to query media program database 124, thereby determining candidate video content matching (e.g., via natural language processing) the set of keywords.

Next, at step 206, the candidate video content is presented to the user, allowing the user to select the desired video content. The selected video content is then displayed within the video region 302, displacing the video that the user had been previously viewing.

Figure 4:
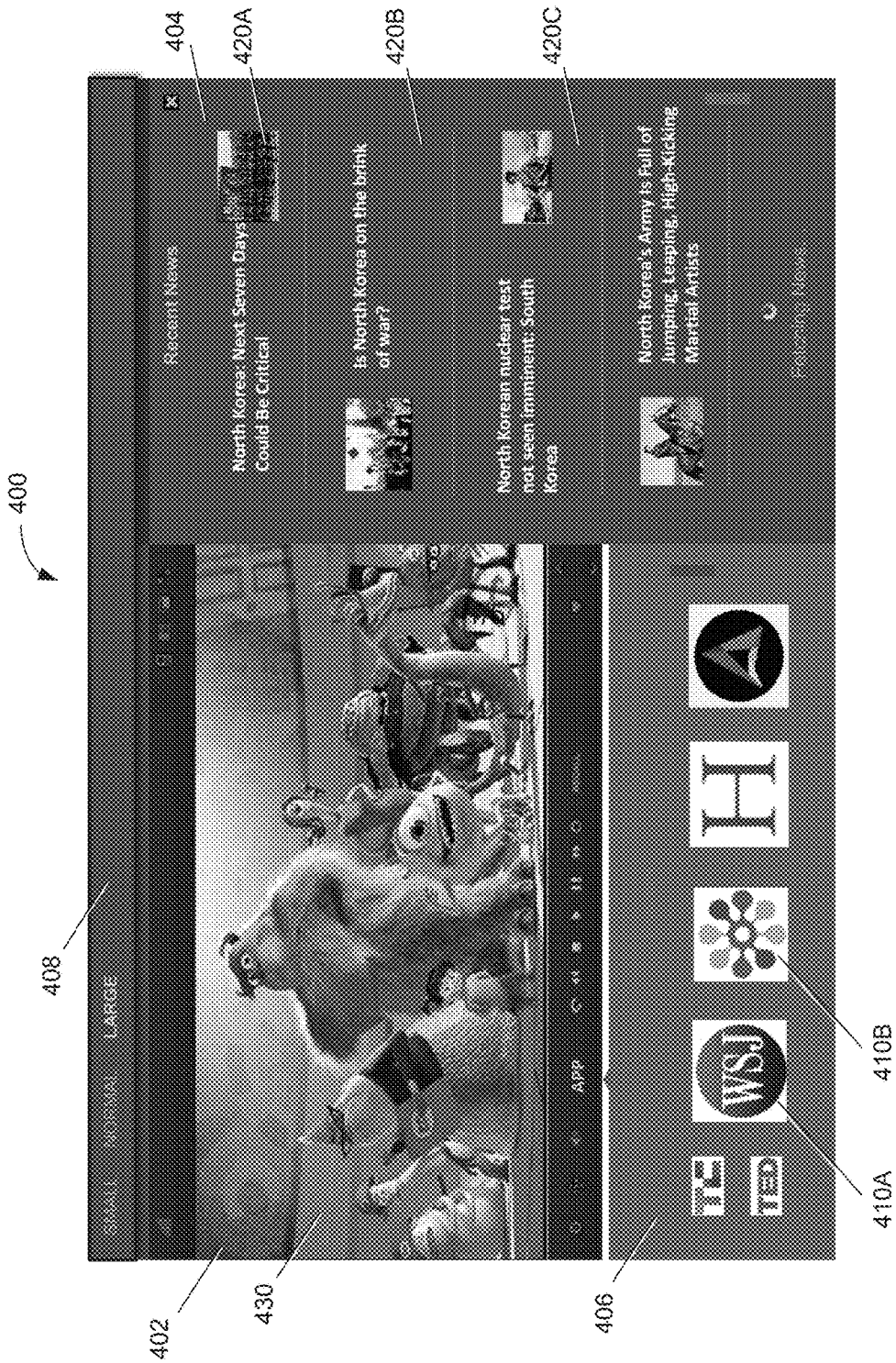
FIGS. 4-6 illustrate a sequence of video displays illustrating operation of various embodiments.
Figure 5:
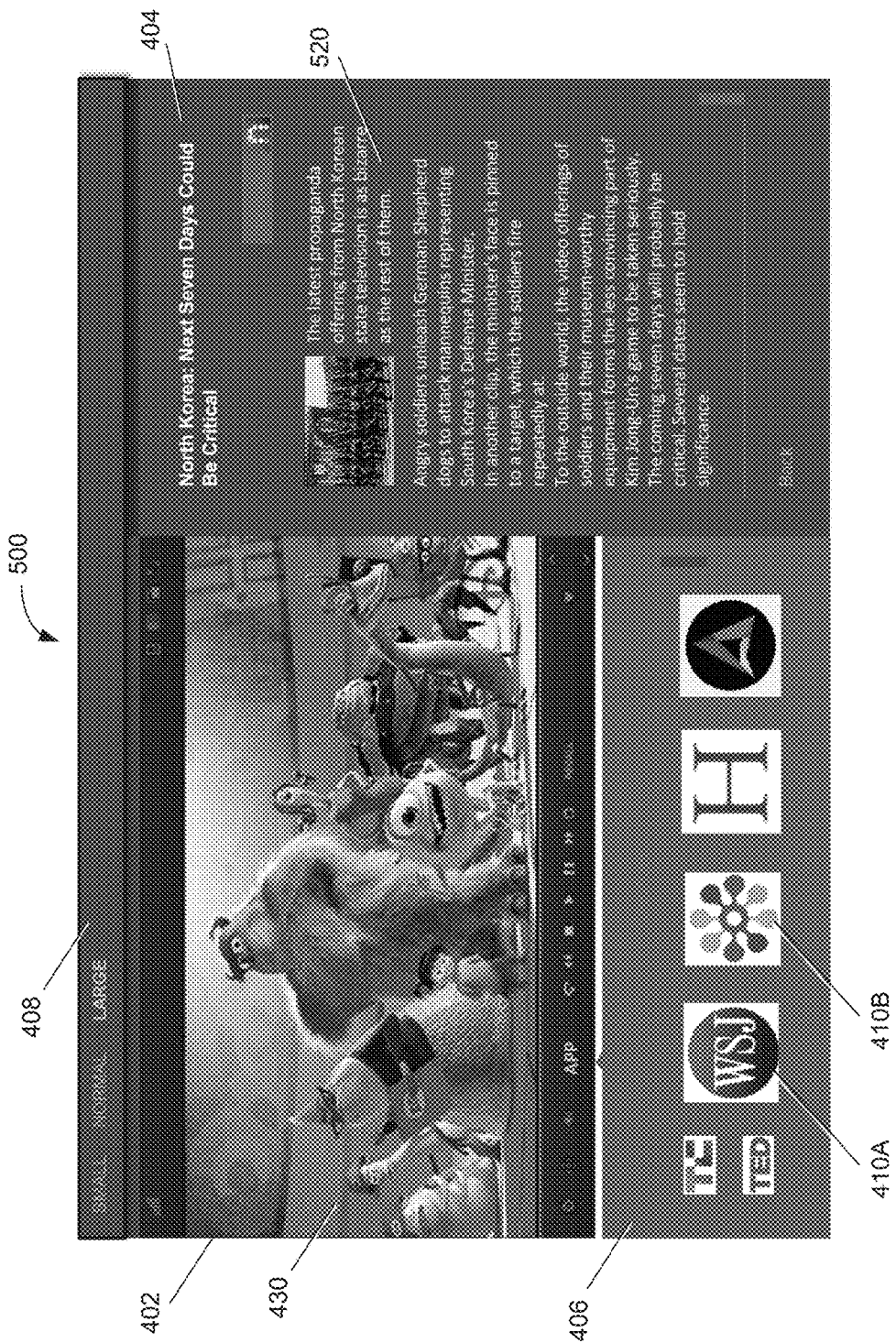
Figure 6:
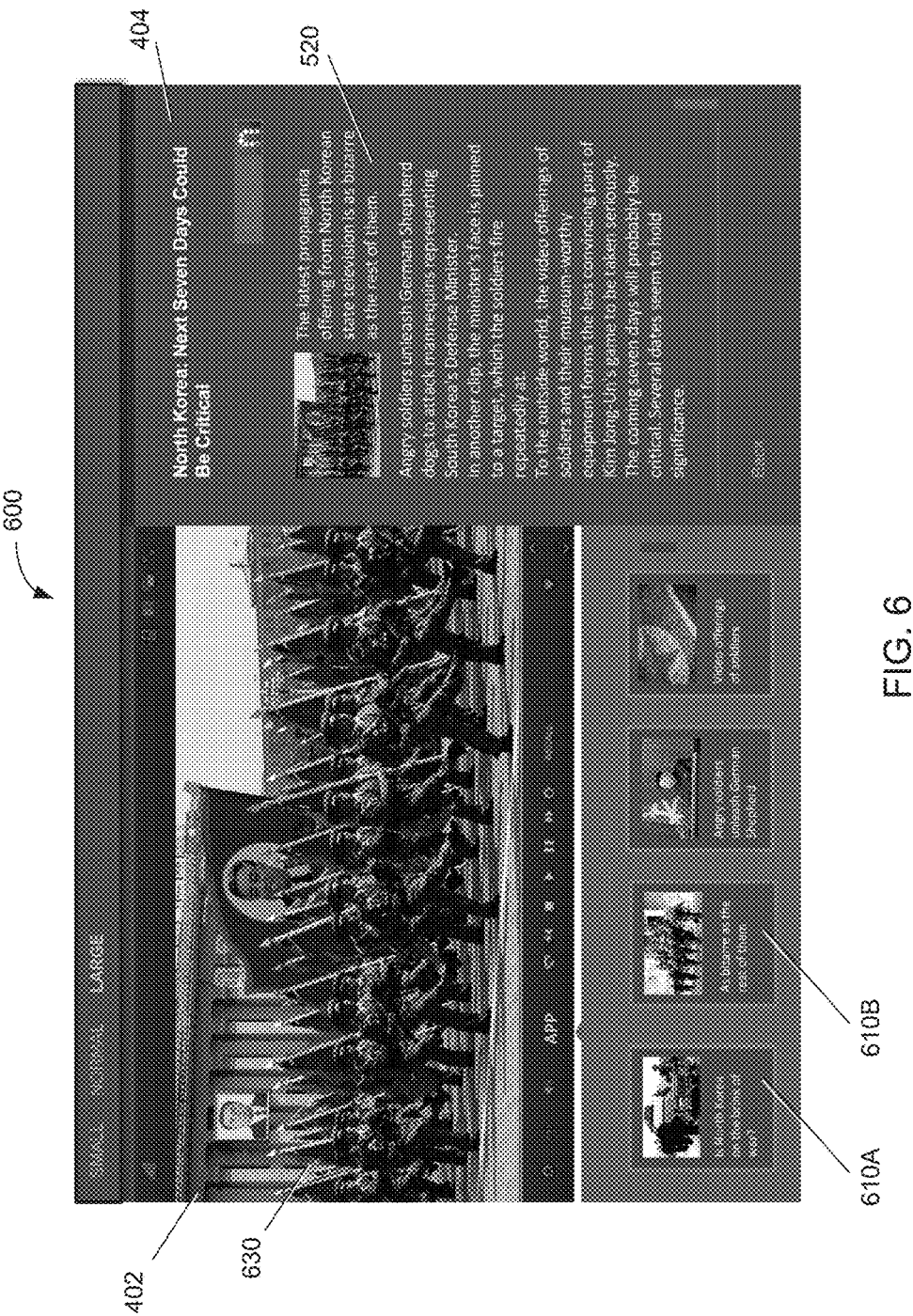

Having thus given a general overview of a method in accordance with one embodiment, FIGS. 4-6 present a sequence of images corresponding to a particular, non-limiting example. As shown in FIG. 4, video content 430 (e.g., a streaming movie as shown) is displayed within a video region 430 alongside application content (news items 420A-C) within an application region 404. Also shown is a notification bar 408 (e.g., for displaying social networking status, alerts, and other such notifications) and a list of content sources 410A, 410B within an options region 406. As will be apparent, news items 420A-C, which relate to news regarding North Korea, do not relate to video content 430 being displayed within video region 402.

Referring to FIG. 5, application region 404 reflects the case where the user has selected news item 420A of FIG. 4, resulting in an expanded news story being displayed within application region 404. At this point, the text within application region 404 may be parsed (e.g., by a plug-in or other application running on the device on which video content 430 is being displayed) to determine relevant keywords (e.g., "North Korea", "German Shepherd", "Kim Jong-Un", etc.). As mentioned above, these keywords can then be transmitted to a remote device (e.g., device 108) capable of querying an external database (e.g., media program database 124) to locate candidate video content whose title or other metadata matches to some extent the set of relevant keywords.

FIG. 6 illustrates the result, in which the candidate video content 610A, 610B is displayed within options regions 406. That is, thumbnails of relevant videos (i.e., each relating to North Korea) are presented to the user, and a selected video (630) is being displayed within video region 402.

Many other modifications and enhancements could be provided in a wide array of alternate but equivalent embodiments. The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of viewing video content, comprising:
   displaying video content in a video region of a display;
   displaying application content in an application region of the display, wherein the application region is a web browser window, and wherein the application content includes a news feed including a plurality of news items;
   in response to the user selecting a first news item, displaying an extended news story corresponding to the first news item within the application region of the display;
   parsing text of the extended news story to determine a set of keywords;
   querying a video content database with the set of keywords to determine candidate video content;
   displaying, in a third region of the display, thumbnail images of the candidate video content;
   determining, in response to user selection of one of the thumbnail images of the candidate video content, selected video content; and
   displaying the selected video content in the video region of the display;
   wherein the video region of the display is simultaneously rendered within the web browser window adjacent to the news feed rendered within the application region of the display and such that the video region of the display is not occluded by the news feed.

2. The method of claim 1, wherein the web browser includes a software plug-in configured to parse text of the application content to produce a set of keywords, and transmit the set of keywords to a media device over a network.

3. A video content display system, comprising:
   a computing device configured to display video content in a video region of a display and display application content in an application region of the display, wherein the application region is a web browser window, and wherein the application content includes a news feed; wherein
   a media device communicatively coupled to the computing device over a network, the media device including a discovery engine configured to determine, based on the application content, candidate video content relevant to the application content and determine, in response to user input, selected video content;
   wherein the computing device is configured to display the selected video content in the video region of the display such that the user can play the selected video content in the video region of the display;
   wherein the video region of the display is simultaneously rendered within the web browser window adjacent to the news feed rendered within the application region of the display such that the video region is not occluded by the news feed; and
   wherein the news feed includes a plurality of news items and, in response to the user selecting a first news item, the computing device displays an extended news story corresponding to the first news item within the application region of the display, parses text of the extended news story to determine a set of keywords, queries the video content database with the set of keywords to determine candidate video content, displays, in a third region of the display, thumbnail images of the candidate video content, and determines, in response to user selection of one of the thumbnail images of the candidate video content, the selected video content.

4. The system of claim 3, wherein the web browser includes a software plug-in configured to parse text of the application content to produce a set of keywords, and transmit the set of keywords to a media device over a network.

5. Non-transitory computer-readable media bearing software instructions that, when executed by a processor, cause the processor to:
   display video content in a video region of a display;
   display application content in an application region of the display, wherein the application region is a web browser window, and wherein the application content includes a news feed including a plurality of news items;
   in response to the user selecting a first news item, display an extended news story corresponding to the first news item within the application region of the display;
   parse the text of the extended news story to determine a set of keywords;
   query a video content database with the set of keywords to determine candidate video content;
   display, in a third region of the display, indicia of the candidate video content;
   determine, in response to user selection of one of the indicia of the candidate video content, selected video content; and
   display the selected video content in the video region of the display, wherein the video region of the display is rendered simultaneously within the web browser window adjacent to the news feed rendered within the application region of the display such that the video region is not occluded by the news feed.

6. The non-transitory computer-readable media of claim 5, wherein the web browser includes a software plug-in configured to parse text of the application content to produce a set of keywords, and transmit the set of keywords to a media device over a network.

\* \* \* \* \*